United States Patent [19]

Olsen

[11] Patent Number: 5,578,399
[45] Date of Patent: Nov. 26, 1996

[54] POLYMERIC CURRENT COLLECTOR FOR SOLID STATE ELECTROCHEMICAL DEVICE

[76] Inventor: Ib I. Olsen, 1800 Green Valley Park Way, #223, Henderson, Nev. 89014

[21] Appl. No.: 528,970

[22] Filed: Sep. 15, 1995

[51] Int. Cl.$^6$ .................................................. H01H 4/66
[52] U.S. Cl. ..................... 429/245; 429/192; 429/194; 429/212; 429/218; 429/234
[58] Field of Search ................................. 429/212, 234, 429/245, 194, 218, 192

[56] References Cited

U.S. PATENT DOCUMENTS 5,162,178  11/1992  Ohsawa et al. ........................ 429/218
5,464,707  11/1995  Moulton et al. ........................ 429/212

Primary Examiner—Maria Nuzzolillo
Attorney, Agent, or Firm—Charles Jew

[57] ABSTRACT

A solid state electrochemical device comprising (i) an anode, (ii) a cathode, (iii) interposed between the anode and cathode, a polymeric electrolyte, and (iv) adjacent to either the anode or the cathode, on a side opposite to the polymeric electrolyte, a current collector comprising (a) an aluminum or copper foil and (b) on a side of the aluminum foil facing the cathode or the anode, a layer of a cured polymer, in an amount effective to prevent corrosion between the cathode or anode and the aluminum foil, which (1) is conductive, (2) is pin-hole free and (3) adheres to said aluminum foil. The layer of cured polymer provides corrosion resistance to the current collector.

20 Claims, No Drawings

POLYMERIC CURRENT COLLECTOR FOR SOLID STATE ELECTROCHEMICAL DEVICE

BACKGROUND OF THE INVENTION

1. Field of the Invention

The present invention relates to solid state electrochemical devices and, more particularly, to a current collector comprising aluminum or copper foil that is coated with a layer of cured polymer that is pinhole free for corrosion resistance.

2. State of the Art

Electrochemical cells containing an anode, a cathode and a solid, solvent-containing electrolyte are known in the art and are usually referred to as "solid batteries." See, for instance, U.S. Pat. Nos. 5,229,225, 5,238,758, 5,358,801, and 5,366,829. These cells offer a number of advantages over electrochemical cells containing a liquid electrolyte (i.e., "liquid batteries") including improved safety features.

In a typical solid electrochemical cell, a current collector is provided as a support for the cathode. For example, the cathode, which is often prepared in the form of a paste, may be spread onto the current collector and then cured by conventional methods to provide for a solid positive cathodic plate. The cathode (excluding the support) generally has a thickness of between about 20 and 150 μm. Current collectors themselves are well known in the art and are commercially available. Generally, the art to date has employed current collectors for cathodes which are made of roughened nickel (electrolytically deposited nickel) on a nickel current collector. The current collectors are preferably attached to the surface of the cathode not facing the electrolyte but can also be attached to the anode. When the current collector is attached to the cathode, the cathode is interposed between the electrolyte and the current collector.

Current collectors such as nickel have been found to be highly effective in minimizing corrosion in the battery environment. However, while effective in function, nickel current collectors give rise to at least two significant drawbacks. First, nickel is a relatively expensive metal and thus, its use as a current collector appreciably adds to the cost of a solid electrochemical cell. Second, nickel is a relatively heavy metal. Indeed, nickel current collectors employed at the present time in solid electrochemical cells can take up half the weight of the ultimate laminate. This, of course, significantly reduces the energy density available per weight of the cell.

In an attempt to overcome the significant drawbacks associated with nickel current collectors, aluminum has been used to fabricate current collectors. Aluminum is attractive in view of its low cost and low density, which are the problems which have been encountered with nickel. Nonetheless, aluminum has not proven itself to be a completely suitable substitute because it has been found to corrode over time in the battery environment.

SUMMARY OF THE INVENTION

In view of above-described shortcomings associated with prior art current collectors employed in solid state electrochemical devices as well as other disadvantages not specifically mentioned above, it should be apparent that there still exists a need in the art for a current collector which on the one hand is effective in minimizing corrosion in the environment of solid state electrochemical device while at the same time not adding appreciably to either the cost or to the weight of the electrochemical device. The present invention achieves these heretofore elusive combination of properties by providing a current collector in a solid electrochemical device which comprises a layer of aluminum or copper foil onto which is coated a cured conductive polymeric layer.

Thus, the present invention provides, in a first aspect, a solid state electrochemical device comprising:

(i) an anode;

(ii) a cathode;

(iii) interposed between the anode and cathode, a polymeric electrolyte; and (iv) adjacent to either the anode or the cathode, on a side opposite to the polymeric electrolyte, a current collector comprising (a) a metal layer selected from aluminum or copper and (b) on a side of the metal layer facing the cathode or the anode, a coating of a cured polymer, in an amount effective to prevent corrosion between the cathode or anode and the metal layer, which (1) is conductive, (2) is pin-hole free and (3) adheres to the metal layer.

In a second aspect, the present invention provides a method for making a current collector for a solid state electrochemical device including an anode, a cathode, and a polymeric electrolyte interposed between the anode and cathode, the method comprising the steps of:

(i) coating a metal layer with at least one of a monomer and prepolymer which is capable, upon curing, of forming a polymer which (1) is conductive, (2) is pin-hole free and (3) adheres to the metal foil;

(ii) curing the at least one of a monomer and prepolymer to form a coating of a cured polymer, the coating of cured polymer being present in an amount effective to prevent corrosion between the cathode or anode and the metal layer wherein the metal layer comprises aluminum or copper.

The polymeric coating preferably comprises a sufficient amount of conductive material so that the coating has an electrical conductivity of at least 1 S cm$^{-1}$.

DETAILED DESCRIPTION OF PREFERRED EMBODIMENTS

The present invention is based in part on the discovery that a metal layer (e.g., aluminum or copper foil) that is coated with a cured conductive polymer affords effective corrosion protection. However, prior to describing this invention in further detail, the following terms will be defined.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical. Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hereto atom functionalities such as carboxylic acid groups, sulfonic acid groups, and the like. The latter are non-conductive because they strongly bind the alkali cation.

Examples of suitable solid matrix forming monomers include, by way of example, ethyleneimine, ethylene oxide, epichlorohydrine, acryloyl-derivatized polyalkylene oxides (disclosed in U.S. Pat. No. 4,908,283, which is incorporated herein) urethane acrylate, vinyl sulfonate polyalkylene oxides (as disclosed in U.S. Pat. No. 5,262,253 and incorporated herein), acrylic acid, chloroacrylic acid, bromoacrylic acid, crotonic acid, propylene, ethylene and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones. Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "compatible electrolyte solvent," or "electrolytic solvent," or in the context of components of the solid electrolyte, just "solvent," is a low molecular weight organic plasticizer added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as propylene carbonate, ethylene carbonate, gammabutyrolactone, glyme, diglyme, triglyme, tetraglyme, dimethylsulfoxide, dioxolane, sulfolane, and the like. A particularly preferred solvent is disclosed in U.S. Pat. No. 5,262,253, which is incorporated herein. For electrochemical cells where the cathode comprises vanadium oxides, e.g., $V_6O_{13}$ and the anode is lithium, the electrolytic solvent preferably comprises a mixture of propylene glycol and triglyme.

The term "organic carbonate" refers to hydrocarbyl carbonate compounds of no more than about 12 carbon atoms and which do not contain any hydroxyl groups. Preferably, the organic carbonate is a linear aliphatic carbonate and most preferably a cyclic aliphatic carbonate. Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-$\alpha,\beta$-diol or an alkane-$\alpha,\gamma$-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $Li[N(SO_2CF_3)_2]$, $LiCF_3SO_3$, $LiPF_6$, $NaSCN$, and the like. The inorganic ion salt preferably contains at least one atom selected from the group consisting of Li, Na and K.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/parallel arrangement to provide the required operating voltage and current levels.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated manganese oxides, e.g., $LiMn_2O_4$, lithiated nickel oxides, e.g., $LiNiO_2$, and mixtures thereof.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like.

A preferred method of fabricating an electrochemical cell is described herein. In addition, methods for preparing solid electrochemical cells and batteries are described in the art, for example, in U.S. Pat. No. 5,300,373, 5,316,556, 5,346,385, 5,262,253 and U.S. Patent application Ser. No. 07/918,509 filed Jul. 22, 1992; 08/049,212, filed Apr. 19, 1993, which are all incorporated herein in their entirety.

In one preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000 when the cathode includes $V_6O_{13}$, the cathode paste preferably further comprises from about 10 to 50 weight percent of solvent comprising a 10:1 to 1:4 (w/w) mixture of an organic carbonate and a glyme and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 40 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid matrix monomer or partial polymer (or polymeric matrix formed therefrom) based on the total weight of the electrolyte; preferably from about 10 to about 20 weight percent.

In a preferred embodiment, the electrolyte composition further comprises a small amount of a film forming agent (also referred to as a viscosifier). Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

As the current collector, the present invention employs a layer of aluminum which is coated with a layer of a polymer which has been cured and which is present in an amount effective to prevent corrosion of the aluminum in the environment of a solid electrochemical device.

Such amount will generally range between about 0.5 and 25 The layer of aluminum itself should have a thickness ranging between about 1 and about 100 µm, preferably between about 10 and about 50 µm. Above 50 µm, there is little additional functional benefit derived from the current collector and the energy density of the final electrochemical device is reduced. Conversely, below about 1 µm, there is not obtained enough of a current collecting effect and this results in an undesirably high resistance in the device and too much energy loss. The aluminum layer is preferably present in the form of a foil although it may also be present as aluminum plated onto another base such as a plastic foil.

Alternatively, copper can be used with the current collector although the invention will be illustrated using aluminum. The dimensions of a copper layer would be comparable to that of the aluminum layer. Aluminum is more preferred because it is lighter in weight.

Before applying the polymeric coating layer onto the layer of aluminum, it is preferable to pre-treat the aluminum surface in addition to roughening it as described above. (Pretreatment is optional.) For example, the aluminum should first be degreased in accordance with techniques well known to persons skilled in the art such as employing an alkaline galvanic degreasing. In particular, an alkaline solution such as 2 to 10M KCN is contacted with the aluminum sheet while applying a current of between 5 and 15 mA/cm$^2$. After rinsing the de-greased aluminum sheet with water, the sheet is desirably stained with a 10 to 20% solution of an alkaline material such as NaOH in order to stabilized the surface of the sheet.

After pretreatment a layer of the polymeric coating is applied onto the aluminum. Generally, there may be employed for such coating layer any monomer or prepolymer which, upon crosslinking, forms a polymeric layer which (1) is conductive, (2) is pin-hole free and (3) adheres to said aluminum foil. Generally, the above described combination of properties are obtained by applying to the aluminum layer a mixture of an acrylated monomer and/or acrylated prepolymer. (Methacrylated monomers and/or methacrylated prepolymers are also preferred.) Especially preferred among the acrylated monomers and prepolymers are urethane acrylate and epoxy acrylate. Other suitable monomers and prepolymers include vinyl, epoxy and thiolene monomers and prepolymers. Mixtures of different monomers and/or prepolymers can be used.

The monomer and/or prepolymer which is applied to the underlying aluminum layer advantageously includes a number of additional components. For example, it is necessary to add to the monomer/prepolymer a sufficient amount of an additive which will impart conductivity to the final polymer such as graphite, carbon black, metal particles or conductive polymers, or mixtures thereof. Suitable conductive polymers include, for example, polyacetylene, polythiophene and polypyrole. Admixture of conductive additives or materials such as graphite or carbon black to the monomer/prepolymers can form a paste. Preferably, the amount of conductive material should impart an electrical conductivity of at least 1 S cm$^{-1}$. When the conductive additive is graphite or carbon the electrical conductivity is between about 1 to about 2 S cm$^{-1}$; whereas when the conductive additive is metal particles the electrical conductivity can be as high as about 1,000 S cm$^{-1}$. The conductive material may comprise up to about 50% by volume of the polymeric coating.

Other conventional additives may be included in the monomer/prepolymer mixture. For example, an adhesion promoter may be included in an amount effective to promote adhesion between the polymeric layer and the underlying aluminum layer. Typically, the amount of adhesion promoter included in the monomer/prepolymer mixture will range between 5 and 30% by weight based on the weight of the monomer/prepolymer mixture. Adhesion promoters which can be used in the practice of the present invention are selected from those generally known in the art. A preferred adhesion promoter is acrylated phosphoric acid available as UCB Ebecryl 169™ from UCB Chemical Corp. Smyrna, Ga.

To formulate the monomer and/or prepolymer mixture, the monomer and/or prepolymer are first combined with up to 50% of the conductive particles which often result in the formation of a paste. When a paste is formed, it desirably has a consistency such that the monomer/prepolymer mixture may be coated onto a substrate and kept there until curing. Of course, the invention may be practiced without any paste formation. The precise method of applying the monomer/prepolymer mixture will naturally be dependent on the nature of mixture. For example, a printing application technique is suitable where the monomer/prepolymer is in the form of a liquid, often one which evaporates away from the polymeric precursors as well as from the conductive particles after application to the underlying layer of aluminum.

After the preparation of the mixture including the monomer and/or prepolymer (and any other additives), the mixture is coated onto the aluminum substrate. The thickness of the applied layer when in the form of a paste should be between about 0.5 and about 5 µm, preferably between about 1 and about 3 µm. Any of the well known coating techniques typically employed in this art may be used according to the present invention. The technique must be one which will provide a monomer/prepolymer layer which is free of any pinholes as the presence of such pinholes could result in corrosion of the underlying aluminum substrate by corrosive components present in the other layers of the solid electrochemical device. Exemplary techniques include gravure printing offset.

Regardless of the physical form in which the polymeric precursor and conductive particles are applied to the underlying aluminum layer, such precursors are next cured in accordance with techniques well known in the art. Quite clearly, the optimum curing technique will depend upon the precise nature of the monomer/prepolymer paste which has been employed. Among such suitable curing techniques are electron beam and ultraviolet radiation. When the monomer/prepolymer is an acrylate, a preferred technique is to employ electron beam curing at a power and for a sufficient period of time to substantially cross-link the monomer/prepolymer mixture. Typically, curing should be carried out at a power level of between 10 and 20 kGy.

The resulting layer of crosslinked polymer is one which has good mechanical properties, is pinhole free, and exhibits good electrical conductivity.

The thickness of the cured polymeric layer is selected so as to provide enough of a barrier layer between the aluminum sheet and the rest of the electrochemical cell such that there is no resulting corrosion to the aluminum sheet. Of course, the thickness of the cured polymeric layer should be minimized to the extent that it does not appreciably detract from its protective effect so as not to appreciably add to the weight and to the thickness of the electrochemical device. The cured polymeric layer has a thickness ranging between about 0.5 and about 25 μm, preferably between about 1 and about 3 μm.

As compared to conventional nickel current collectors, the aluminum current collector coated with a cured polymer according to the present invention adds about 40% less weight to the final electrochemical device and saves about 10% in cost.

An aluminum current collector suitable for use with anodes and cathodes was prepared as follows.

A mixture comprising 38% of urethane acrylate, Akcros Photomer 6140™, 9.5% of epoxy acrylate, UCB Ebecryl 220™, 12.4% of UCB Hdda™, 4.8% of UCB Ebecryl 169™ (adhesion promotor), 22.8% of trimethoxy-polyethylenoxide-triacrylate, Henkel Photomer 4158™, and 12.5% of carbon black, Shawinigan Black™ (available from Chevron Chemical Co., San Ramon, Calif.) (all percentages by weight) was formed. The admixture formed a highly viscous paste which was coated by a wire bar to a thickness of 20 μm onto an aluminum foil of thickness of 25 μm and cured by electron beam at a power level of 50 kGy.

The resulting coating showed good adhesion to the aluminum foil, good mechanical properties, and good conductivity. An electrochemical device including the aluminum coated with cured polymer is assembled in accordance with techniques well known in the art.

EXAMPLE

The following Example 1 illustrates a method of how an electrolytic cell could be fabricated employing the polymer coated aluminum current collector described above.

A solid electrolytic cell is prepared by first preparing a cathodic slurry which is spread onto a current collector. An electrolyte solution is then placed onto the cathode surface and the cathode slurry and electrolyte solution are simultaneously cured to provide for a solid electrolyte composition. Similarly, an anode composition is placed on a current collector. Thereafter, the anode and cathode are laminated so that the solid electrolyte composition is situated therebetween to provide for a solid electrolytic cell. The specifics of this construction are as follows:

A. The Cathode Current Collector

The cathode current collector employed is a sheet of the above described coated aluminum foil having a layer of cured polymer attached to the surface of the foil which will contact the cathode so as to form a composite having a sheet of aluminum foil, a cathode and a layer of cured polymer interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio. As referred to in this example, "aluminum foil current collector" is meant to include the cured polymer coating.

B. The Cathode

The cathode is prepared from a cathodic slurry which, in turn, is prepared from a cathode powder as follows:

i. Cathode Powder

The cathode powder is prepared by combining 94.1±1.1 weight percent $LiMn_2O_4$ and 5.9±1.1 weight percent of carbon (Shawinigan Black™). About 100 grams of the resulting mixture is placed into a grinding machine (Attritor Model S-1 available from Union Process, Akron, Ohio) and ground for 30 minutes at 150 rpm. Afterwards, the resulting mixture is passed through a 200 mesh screen and then vacuum dried at 60° C. to produce a cathode powder with a water content of less than about 1000 ppm and preferably less than about 300 ppm.

ii. Cathode Slurry

A cathode slurry is prepared by combining sufficient cathode powder to provide for a final product having about 51.7 weight percent $LiMn_2O_4$. The slurry contains the following (in approximate weight percent):

| | |
|---|---|
| $LiMn_2O_4$ | 51.744% |
| Carbon | 6.456% |
| EPDM (ethylene propylene diene monomer) | 1.8% |
| Xylene | 40.0% |
| | 100% |

The method of preparing 100 grams of the cathode slurry is as follows:

1.8 grams of EPDM (Mooney viscosity of 26±5 and available as VISTALON™ 2504 (Exxon Chemicals Co., Houston, Tex.) are mixed with 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of carbon powder sufficient to provide 51.744 grams of $LiMn_2O_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The above EPDM-xylene solution is passed through 4A molecular sieves and then added to the $LiMn_2O4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The extruded cathode slurry is then coated to a substantially uniform thickness of about 25–200 μm, more preferably 50–100 μm, and most preferably about 100 μm, over the aluminum foil current collector by a doctor blade, Meyer-rod, or by reverse roll coating. The cathode slurry/current collector is heated to remove the xylene.

C. Electrolyte 36.26 grams of propylene carbonate, 3.45 grams of trimethyl propyl triacrylate, 36.26 grams of ethylene carbonate, and 13.79 grams of urethane acrylate (Actilane SP023, available from Akcros Chemicals, Ltd., Manchester, England) are combined at room temperature until homogeneous. The resulting solution is optionally passed through a column of 4A molecular sieves to remove water and then the recovered solution is mixed at room temperature until homogeneous. If necessary, the ethylene carbonate can first be dissolved in propylene carbonate with heat.

At this point, 1.47 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° and 65° C. with stirring until the film forming agent is dissolved. A thermocouple is placed at the edge of the vortex created by the magnetic stirrer to monitor solution temperature. The solution is cooled to a temperature of less than 48° C. and then 8.77 grams of $LiPF_6$ are added to the solution over a 120 minute period while thoroughly mixing to ensure a substantially uniform temperature profile throughout the solution. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following in approximate weight percent based on the total weight of the electrolyte solution (100 g):

| | |
|---|---|
| Propylene Carbonate | 36.26% |
| Ethylene Carbonate | 36.26% |
| Trimethylol propyl triacrylate (TMPTA) | 3.45% |
| Urethane Acrylate | 13.79% |
| $LiPF_6$ | 8.77% |
| PEO Film Forming Agent | 1.47% |
| Total | 100% |

This solution is then degassed to provide for an electrolyte solution wherein little, if any, of the $LiPF_6$ salt decomposes.

Optionally, the above solution which contains the prepolymer, the film forming agent, the electrolytic solvent and the $LiPF_6$ salt, is filtered to remove any solid particles or gels remaining in the solution. One suitable filter device is a sintered stainless steel screen having a pore size between 1 and 50 μm at 100% efficiency.

In an alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and ethylene carbonate and dry the solution over 4A molecular sieves (Grade 514, 8-12 Mesh from Schoofs Inc., Moraga, Calif.) and then proceed to step 4.
2. Dry the propylene carbonate and ethylene carbonate over 4A molecular sieves (Grade 514, 8-12 Mesh from Schoofs Inc., Moraga, Calif.).
3. At room temperature, <30° C., add the urethane acrylate to the solvent prepared in step 2. Stir until the resin is completely dissolved. The solution should be clear and colorless.
4. Dry and optionally sift the polyethylene oxide film forming agent through a 25 mesh mini-sieve commercially available as Order No. 57333-965 from VWR Scientific, San Francisco, Calif. While stirring add the dried and pre-sifted polyethylene oxide film forming agent slowly to the solution. The polyethylene oxide film forming agent should be sifted into the center of the vortex formed by the stirring means at a controlled rate to avoid agglomerate formation. Addition of the polyethylene oxide film forming agent should be dispersive and, during addition, the temperature should be maintained at room temperature (<30° C.).
5. After final addition of the polyethylene oxide film forming agent, stir to ensure that the film forming agent is substantially dispersed.
6. Heat the mixture to 68° to 75° C. and stir until the film forming agent has melted and the solution has become transparent. Optionally, in this step, the mixture is heated to 65° to 68° C.
7. Cool the solution produced in step 6 and when the temperature of the solution reaches 40° C., add the $LiPF_6$ salt very slowly making sure that the maximum temperature does not exceed 55° C. and preferably does not exceed about 40° C.
8. Thereafter, the solution is stirred and degassed. The electrolyte solution is allowed to cool before usage.
9. Optionally, filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is coated by a slot die coater or a reverse roll flexographic coater to a thickness of about 25–50 μm onto the surface of the dried cathode slurry described above.

D. The Anode Current Collector

The anode current collector employed is the above described coated aluminum foil having a layer of cured polymer attached to the surface of the foil which will contact the anode so as to form a composite having a sheet of copper foil, an anode and a layer of cured polymer interposed therebetween. (Alternatively, copper foil can be used as the anode current collector.)

E. The Anode

The anode is prepared from an anodic slurry which, in turn, is prepared from an anode powder as follows:

i. Anode Powder

The anode powder is prepared by combining about 93.81 weight percent of Mitsubishi Gas Carbon™ (a coke-like material) (Mitsubishi Petroleum Co. Ltd, Tokyo, Japan) and about 6.19 weight percent of carbon (Shawinigan Black™). About 100 grams of the resulting mixture is placed into a grinding machine (Attritor Model S-1) and ground for 30 minutes at 150 rpm. Afterwards, the resulting mixture is passed through a 200 mesh screen and then vacuum dried at 60° C. to produce an anode powder with a water content of less than about 1000 ppm and preferably less than about 300 ppm.

ii. Anode Slurry

An anode slurry is prepared by combining sufficient anode powder to provide for a final product having about 54.6 weight percent of the Mitsubishi Gas Carbon. The slurry contains the following (in approximate weight percent):

| | |
|---|---|
| Mitsubishi Gas Carbon | 54.6% |
| Carbon | 3.6% |
| EPDM (ethylene propylene diene monomer) | 1.8% |
| Xylene | 40.0% |
| | 100% |

The method of preparing 100 grams of the anode slurry is as follows:

1.8 grams of EPDM (VISTALON™ 2504) are mixed in 16.2 grams of xylene to form a 10.0% (wt.) EPDM solution. The temperature is maintained at between 40–45 C as the EPDM is added to the xylene. The solution is preferably filtered through a 20 micron filter cartridge.

An amount of anode powder sufficient to provide 54.6 grams of Mitsubishi Gas Carbon per 100 grams of anode slurry and a sufficient amount of carbon (Shawinigan Black™) to provide 3.6 grams of total carbon per 100 grams of slurry are mixed in a double planetary mixer where the blend is stirred at 7.5 Hz and 25° C. The above EPDM-xylene solution is passed through 4A molecular sieves and then added to the Gas Carbon and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The so-prepared anode slurry can be placed onto the adhesion layer of the aluminum foil current collector by coating a layer of slurry having a substantially uniform thickness of about 25–200 μm, more preferably 50–100 μm, and most preferably about 50 μm, over the aluminum foil current collector by a doctor blade, Meyer-rod, or by reverse roll coating. The anode slurry/current collector is then heated to remove the xylene.

F. The Solid Electrolytic Cell

A sheet comprising a solid battery is prepared by laminating the anode composite with the electrolyte/cathode composite so that the electrolyte is positioned between the anode and cathode. Lamination is accomplished by minimal pressure.

Thus, it can be appreciated that the present invention, in providing a current collector of aluminum coated with a crosslinked polymer, achieves a combination of properties which heretofore were not achievable. In particular, in addition to providing a desired current collecting function and preventing corrosion of the cathode or anode by the rest of the electrochemical device's components, the present invention provides such a layer without significantly adding to the weight, thickness or to the cost of the final product, in contrast to electrochemical devices wherein nickel is employed as the current collector.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A solid state electrochemical device comprising:
   (i) an anode;
   (ii) a cathode;
   (iii) interposed between the anode and cathode, a polymeric electrolyte; and
   (iv) adjacent to either the anode or the cathode, on a side opposite to the polymeric electrolyte, a current collector comprising (a) a metal layer comprising aluminum or copper and (b) on a side of the metal layer facing the cathode or the anode, a polymeric coating comprising a cured polymer, in an amount effective to prevent corrosion between the cathode or anode and the metal layer, which (1) is conductive, (2) is pin-hole free and (3) adheres to said metal layer, wherein the polymeric coating comprises a sufficient amount of conductive material so that the polymeric coating has an electrical conductivity of 1 $Scm^{-1}$ or higher.

2. The solid state electrochemical device of claim 1 wherein the polymeric coating has a thickness ranging between about 1 and about 3 μm.

3. The solid state electrochemical device of claim 1 wherein said cured polymer is prepared from at least one of an acrylated monomer, acrylated prepolymer and methacrylated monomer or methacrylated prepolymer.

4. The solid state electrochemical device of claim 3 wherein said acrylated monomer is urethane acrylate or epoxy acrylate.

5. The solid state electrochemical device of claim 3 wherein said acrylated prepolymer is prepared from a urethane acrylate or epoxy acrylate.

6. The solid state electrochemical device of claim 1 wherein said conductive material is selected from graphite, carbon black, metal particles, conductive polymers, and mixtures thereof.

7. The solid state electrochemical device of claim 6 wherein said conductive polymers are selected from polyacetylene, polythiophene, polypyrole, and mixtures thereof.

8. The solid state electrochemical device of claim 1 wherein said cured polymer further comprises an adhesion promotor.

9. The solid electrochemical cell of claim 1 wherein the anode is an intercalation based anode comprising carbon.

10. The solid electrochemical cell of claim 1 wherein the cathode comprises materials selected from the group consisting of lithiated cobalt oxides, lithiated manganese oxides, lithiated nickel oxides, and mixtures thereof.

11. The solid electrochemical cell of claim 9 wherein the cathode comprises materials selected from the group consisting of lithiated cobalt oxides, lithiated manganese oxides, lithiated nickel oxides, and mixtures thereof.

12. A method for making a current collector for a solid state electrochemical device including an anode, a cathode, and a polymeric electrolyte interposed between the anode and the cathode, the method comprising the steps of:
   (i) coating a metal layer comprising aluminum or copper with at least one of a monomer and prepolymer which is capable, upon curing, of forming a polymer which (1) is pin-hole free and (2) adheres to said metal layer;
   (ii) curing said at least one of a monomer and prepolymer to form a polymeric coating of a cured polymer, said polymeric coating being present in an amount effective to prevent corrosion between the cathode or anode and the aluminum foil, and wherein said polymeric coating comprises a sufficient amount of conductive material so that the polymeric coating has an electrical conductivity of 1 $Scm^{-1}$ or higher.

13. The method of claim 12 wherein the polymeric coating has a thickness ranging between about 1 and about 3 μm.

14. The method of claim 12 wherein said cured polymer layer is prepared from at least one of an acrylated monomer, acrylated prepolymer, methacrylated monomer or methacrylated prepolymer.

15. The method of claim 14, wherein said acrylated monomer is urethane acrylate or epoxy acrylate.

16. The method of claim 12 wherein said conductive material is selected from graphite, carbon black, metal particles, conductive polymers, and mixtures thereof.

17. The method of claim 16 wherein said conductive polymers are selected from polyacetylene, polythiophene polypyrole, and mixtures thereof.

18. The method of claim 12 further comprising the step of premixing said at least one of a monomer and prepolymer with an adhesion promotor compound.

19. The method of claim 12 wherein said monomer or prepolymer and said conductive material are present in a mixture comprising a solvent; the method comprises coating said mixture onto said metal layer, whereby said solvent being one which evaporates away prior to crosslinking of said monomer or prepolymer.

20. The method of claim 12 wherein said step of curing comprises irradiation with electron beams or ultraviolet light.

* * * * *